United States Patent [19]
Longo, Sr.

[11] Patent Number: 5,857,807
[45] Date of Patent: Jan. 12, 1999

[54] MUNICIPAL SOLID WASTE LANDFILL SYSTEM

[75] Inventor: Robert Joseph Longo, Sr., Mendham, N.J.

[73] Assignee: R. J. Longo Construction Co., Inc., Denville, N.J.

[21] Appl. No.: 661,336

[22] Filed: Jun. 14, 1996

[51] Int. Cl.⁶ .................................................. B09B 1/00
[52] U.S. Cl. ...................... 405/129; 166/369; 210/901; 405/128
[58] Field of Search .................... 166/369, 370; 210/170, 901; 405/53, 128, 129, 270; 588/252, 259

[56] References Cited

U.S. PATENT DOCUMENTS

| | | |
|---|---|---|
| 2,164,536 | 7/1939 | McCarthy . |
| 3,586,624 | 6/1971 | Larson .................................... 210/747 |
| 3,705,851 | 12/1972 | Brauer ................................. 405/129 X |
| 4,026,355 | 5/1977 | Johnson et al. ......................... 166/246 |
| 4,194,855 | 3/1980 | Egger ................................. 210/901 X |
| 4,323,367 | 4/1982 | Ghosh ................................ 405/129 X |
| 4,350,461 | 9/1982 | Valiga et al. ............................. 405/128 |
| 4,469,176 | 9/1984 | Zison et al. ......................... 405/129 X |
| 4,518,399 | 5/1985 | Croskell et al. .................... 405/129 X |
| 4,526,615 | 7/1985 | Johnson ............................. 405/129 X |
| 4,696,599 | 9/1987 | Rakoczynski et al. .................. 405/129 |
| 4,838,733 | 6/1989 | Katz ........................................ 405/129 |
| 5,040,920 | 8/1991 | Forrester ................................ 405/129 |
| 5,054,406 | 10/1991 | Judd .................................... 405/129 X |
| 5,190,406 | 3/1993 | Shannonhouse et al. .............. 405/129 |
| 5,201,609 | 4/1993 | Johnson ................................. 405/129 |
| 5,215,409 | 6/1993 | Jax et al. ............................... 405/129 |
| 5,259,697 | 11/1993 | Allen et al. ............................ 405/129 |
| 5,320,450 | 6/1994 | Smith ..................................... 405/129 |
| 5,362,182 | 11/1994 | Hergenrother ......................... 405/129 |

OTHER PUBLICATIONS

Polyfelt, Inc., Design and Practice "Geotextile Functions", pp. 2–2 to 2–5, Jun. 1989.

BFI Greentree Landfill—Municipal and Residual Waste Disposal Facility, Jun. 1994.

*Primary Examiner*—George A. Suchfield

[57] ABSTRACT

A municipal solid waste (MSW) landfill system includes a leachate collection system installed in a layer of MSW in a preexisting landfill. The layer of MSW is covered with a layer of waste ash produced by incinerated MSW. The ash is gas impermeable and serves as a methane gas containment layer above the MSW cell. A plurality of columns of crushed stone pass through the ash layer to provide a leachate collection path to the leachate collection system. Alternate layers of ash and MSW fill the landfill with leachate collection columns in each ash layer to collect the leachate from each MSW cell layer. At least one, or as conditions may require, a number of gas wells are installed in each MSW cell for removing methane gas from the cell. The gas wells may be interconnected to collect the gas and supply it to a utilization system or for burn off.

21 Claims, 3 Drawing Sheets

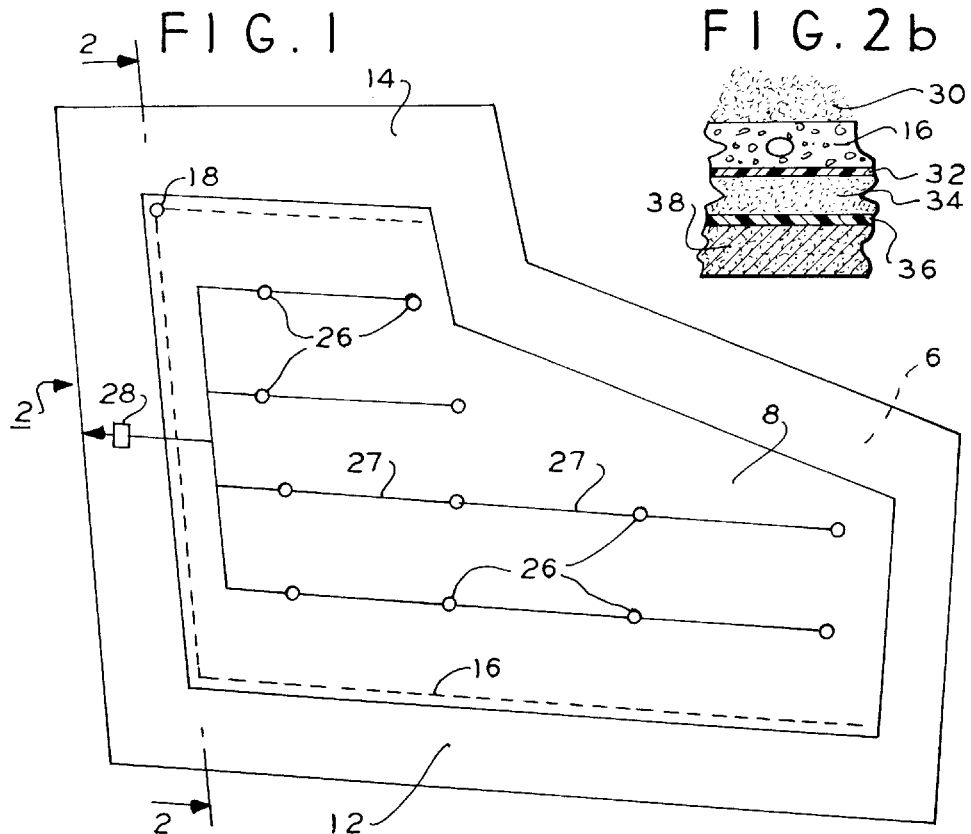
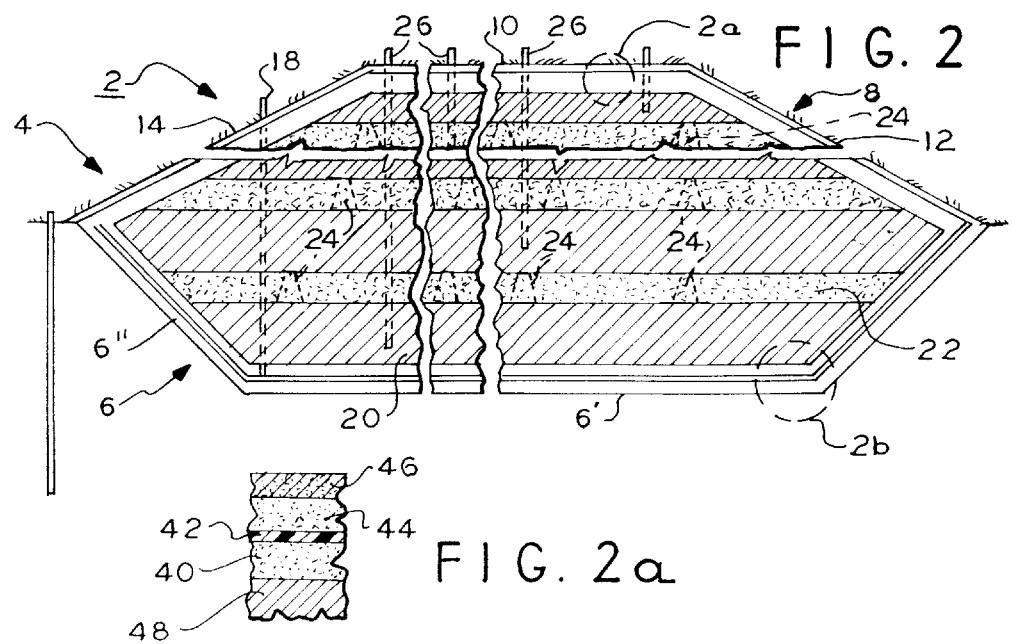

MUNICIPAL SOLID WASTE LANDFILL SYSTEM

This invention relates to solid waste landfill systems.

Solid municipal waste landfill systems are presently constructed to preclude ground soil contamination. Such systems include linings which include compacted soil, geotextile liners and other liners comprising for example high density polyethylene (HDPE), typically 60 mil thick. Geotextile liners are generally fabric-plastic hybrids that are moisture permeable and solid matter impermeable to contain soil particles whereas HDPE is moisture and solid matter impermeable.

The United States Federal Government has issued guide lines for landfills which guidelines appear in 40 CFR Part 241. Part 241.101 contains definitions which are incorporated by reference herein. For example, municipal solid wastes are defined therein as normally, residential and commercial, solid waste generated within a community. Leachate is defined as liquid that has percolated through solid waste and has extracted dissolved or suspended materials from it. For example, leachate may result from rain.

The guidelines include descriptions of recommended requirements, design procedures and operations procedures for numerous involved factors. Such factors include solid wastes accepted and excluded, site selection, design, water quality, air quality, gas control, vectors (A carrier, usually an arthropod, that is capable of transmitting a pathogen from one organism to another.), aesthetics, cover material and compaction among others.

The HDPE liner, by way of example, may be placed over a compacted clay base. A perforated pipe in a stone (river gravel) permeable conduit surrounded by a geotextile (a commercially available liner material, e.g., a fabric type material which is moisture permeable but acts as a soil or solid material barrier) is located in a low permeable flow zone layer over a compacted clay base. Over this may be a non-woven geotextile followed by a low permeability compacted soil layer. Over that there may be a HDPE liner followed by a second stone conduit containing a perforated pipe surrounded by a geotextile and a low permeable layer. The perforated pipes and stone conduits serve to collect leachate.

The lined cavity is then filled with municipal solid waste. The leachate is collected and treated to remove contaminates. The treated leachate may then be released to the ambient or returned to the solid waste material to remove contaminates.

Methane and carbon dioxide are the principal gases produced from decomposing solid waste material. These gases tend to rise through the porous solid waste and escape into the atmosphere. However, methane gas is explosive in air at certain unacceptable concentrations. Landfill design requires that such explosive mixtures are not formed.

Gas collection pipes are inserted into the solid waste to remove pockets of generated methane gas. The location of such pockets is not generally known and the removal of the gas is not reliable or efficient. Presently, gas confining layers are employed to contain the gases in known layers. These containment layers employ compacted tight soils such as fine silts and clay. A gas removal well pipe may be provided in each solid waste layer. The filled landfill is then capped with additional liners and soil layers. The use of soil as a gas containment layer to cover intermediate solid waste layers is wasteful in that space for solid waste is consumed by non-waste material and therefore is not cost effective. A cover may by used on a daily basis as set forth in the above-noted Federal Regulations.

The entire landfill thus comprises a relatively large volume of solid waste in one or more layers in what is referred, to as cells (compacted solid waste enclosed by natural soil or cover material in a land disposal site) and surrounded by a cap comprising outer protective layers formed of combinations of liners and compacted soil.

The present inventors recognize a need for a more efficient landfill system that utilizes present waste material as a gas containment layer and that may be used to fill the landfill.

A solid waste gas landfill system according to the present invention comprises a plurality of juxtaposed layers of solid waste which tend to generate methane gas during decomposition of the solid waste. A gas containment layer of substantially fluid impermeable waste material is intermediate each adjacent pair of juxtaposed solid waste layers. Gas collection means are in communication with each of the solid waste layers for collecting the generated gas in each solid waste layer.

In one embodiment, the substantially fluid impermeable gas containment material comprises ash.

In a further embodiment, leachate collection means is included for each solid waste layer.

In a further embodiment, the leachate collection means comprises a vertical leachate collection conduit means through and corresponding to each impermeable material layer for draining leachate from a next adjacent upper waste layer juxtaposed with that intermediate layer and further leachate collection conduit means transverse to and in fluid communication with the vertical collection conduit means for collecting leachate from the vertical conduit means.

In a still further embodiment, the gas collection means comprises a bore containing permeable stone in each solid waste layer and a perforated pipe embedded in the stone and in communication with the ambient atmosphere above the layers, a separate pipe and bore corresponding to each of the solid waste layers.

IN THE DRAWING

FIG. 1 is a plan top view of a landfill system according to an embodiment of the present invention;

FIG. 2 is a cross sectional elevation view of the system of FIG. 1 taken along lines 2—2 of FIG. 1;

Figure 3:
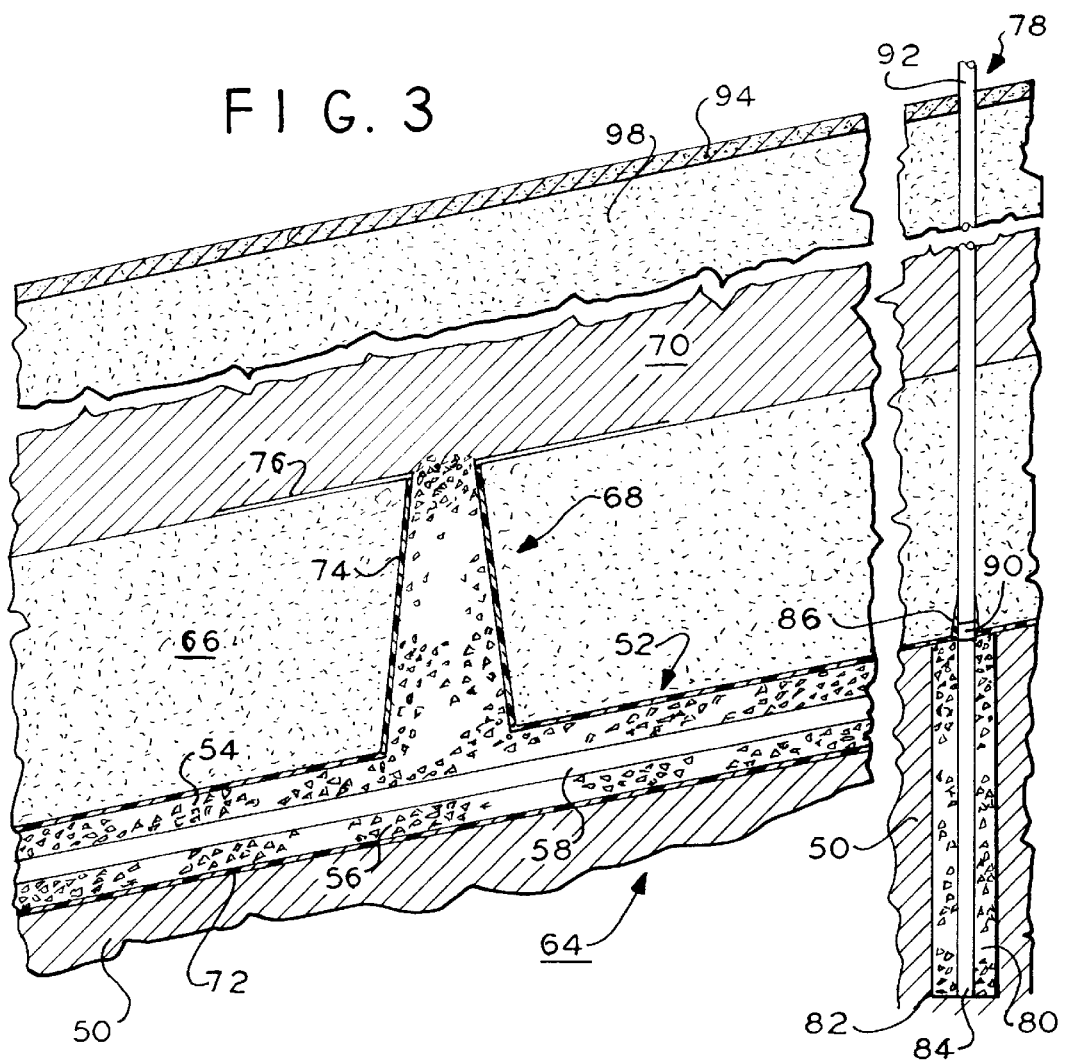
Figure 3A:
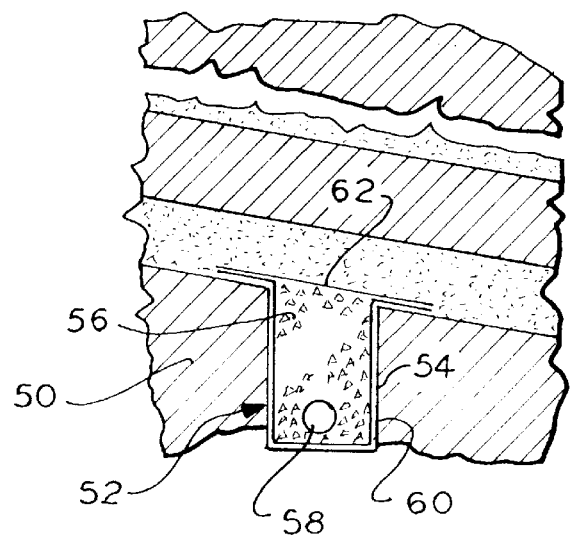

FIGS. 2a and 2b are respective more detailed views of the embodiment of FIG. 2 taken at respective regions 2a and 2b;

FIG. 3 is a fragmented sectional elevation view of a portion of the embodiment of FIG. 2;

FIG. 3a is a sectional elevation view of a leachate collection system employed in the embodiment of FIGS. 1 and 2

Figure 5:
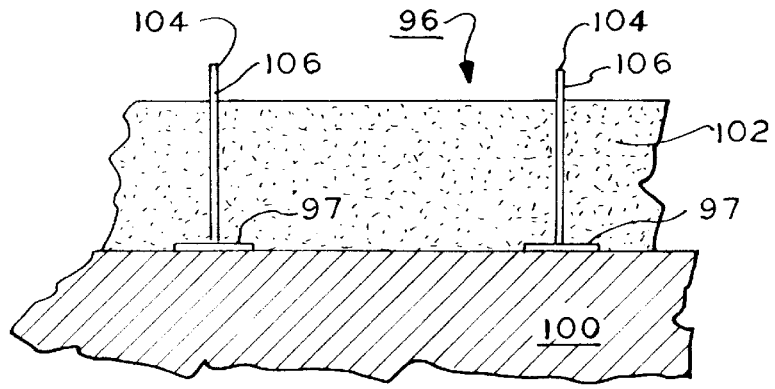
Figure 4:
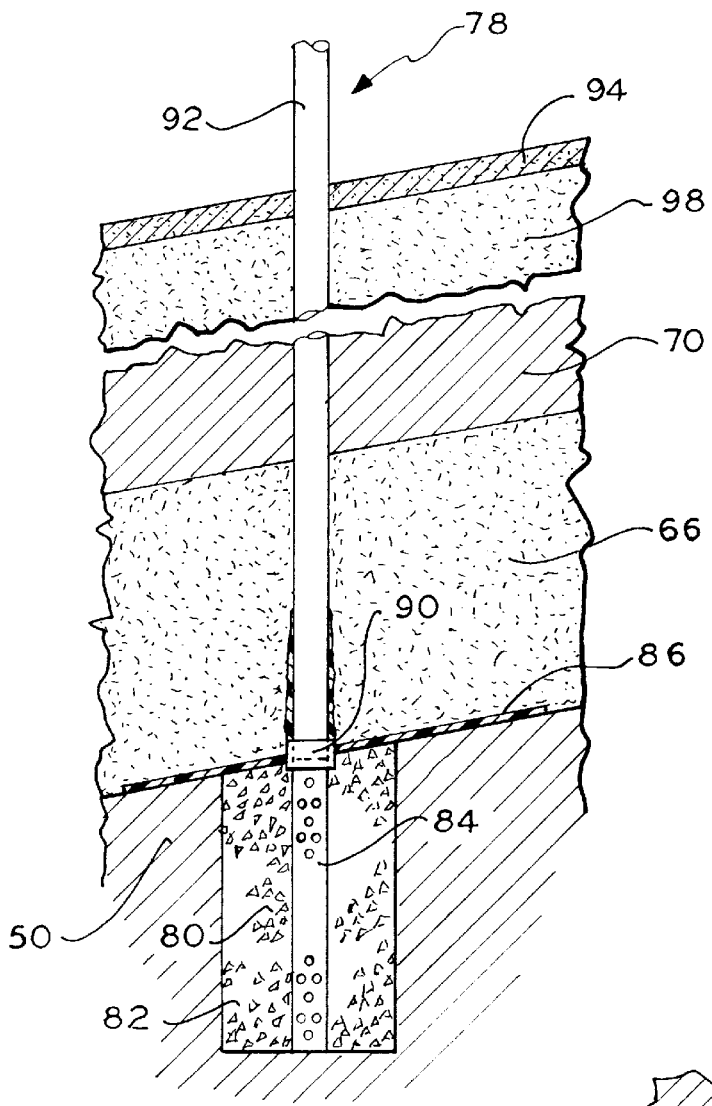

FIG. 4 is a more detailed elevation sectional view of the gas well portion of the embodiment of FIG. 3; and FIG. 5 is a schematic side elevation sectional view of a waste settling monitoring devices.

In FIGS. 1 and 2 a new landfill system 2 comprises an excavated region 4 having a bottom liner 6, collectively referring to soil and man made liner materials, and a cap 8. The bottom liner 6 is generally planar but need not be flat in all implementations as known in this art. The bottom liner 6 has a base 6' and sloping sides 6". The base 6' preferably is inclined slightly from right to left in FIG. 2 with preferably about a 1–2% grade.

In a retrofit landfill system, not shown, the construction may be of any known configuration and may or may not have the various elements of the system 2 described herein.

It should be understood that the system 2 is given by way of example, and that the system described below in connection with system 2 may be used to retrofit existing landfills even those partially filled with municipal solid waste (MSW).

The cap 8 is generally a mirror image of the base 6 but not identical. The cap 8 has a generally horizontal top 10 and sloping peripheral side walls 12 and 14 and so on.

A leachate collection system 16, FIG. 1, is preferably at the bottom liner 6 for collecting leachate. A sump pump and leachate extraction pipe assembly 18 removes the leachate from the collection system 16.

In a preexisting system, the leachate collection system 16 may or may not be present. If not present and the landfill is partially filled with MSW, then a leachate collection system as described below in connection with FIGS. 3 and 3a would be implemented. In preexisting landfills, it may not be known whether a leachate collection system is in place. Thus, in these instances, a leachate collection system of FIG. 3 would be installed. However, it should also be understood that in drier climates a leachate collection system may not be necessary due to small amounts of rainfall. In these landfills, the leachate collection system is optional depending upon engineering analysis of potential leachate present.

A bottom layer 20, FIG. 2, of municipal solid waste (MSW) is over bottom liner 6. A layer 22 of non-hazardous discarded combined ash (fly and bottom ash) resulting from combustion of MSW is placed over the MSW layer 20. This ash layer is relatively impermeable to moisture and migration of solid matter from MSW therethrough. The ash layer may comprise other ash that meets the desired impermeable requirement. It is recognized that this layer serves a dual function. It is disposed of in a landfill since by definition it is waste and needs disposal. It serves as a gas containment layer for methane gas generated in the MSW layer 20. This avoids the use of valuable compacted soil as a gas containment layer as employed in the prior art which also wastes valuable landfill space for non-waste material. The MSW covered by the ash layer 22 may be referred to as a cell. A typical landfill has numerous cells. The size of the landfill and the cells is determined by the availability of land for a particular implementation and by local regulation.

The ash layer 22 serves as a gas containment layer because it is relatively impermeable to gases and liquids. It is composed of relatively fine solid particles having an ideal gas confinement property. A plurality of vertical fluid columns 24 of permeable preferably crushed stone, river bed stone or other acceptable permeable material is formed in spaced regions of the ash layer 22. The columns 24 provide conduits for leachate to flow to the next lower layer 20 of MSW. Subsequent layers of MSW and ash are applied over one another in alternating fashion until the landfill cells are filled. The layers of MSW 20 and ash 22 all are inclined the same approximate 1–2% as the bottom liner.

The ash layer 22 is preferably compacted in layers about one foot thick each and may have a nominal thickness of up to about ten feet. However, the total thickness can vary depending upon the design requirements of the landfill based on MSW daily volume, for example, or other factors according to local conditions. The MSW layers 20, which also are compacted, may have any thickness depending upon permit restrictions issued by a local government. The MSW layers may be about 10–30 foot thick by way of example.

A methane gas collection system comprises a plurality of wells 26. The wells 26 are interconnected by pipes 27 at the top of the landfill and coupled to a blower 28 for methane gas recovery. The gas may be burned off or supplied to a generator or other utilization system according to a given implementation.

By way of example, the bottom liner 6 may comprise an ash protective layer 30, FIG. 2b, placed over the leachate collection system 16 which is over a geotextile 32. A sand buffer 34 is beneath the geotextile 32 which is over an impermeable HDPE liner 36. A bottom layer 38 comprises a compacted clay liner.

The top cap 8, FIG. 2a, may comprise an ash layer 40 over MSW 48. An impermeable liner 42 is over the ash layer 40 followed by a cover layer 44 which may be ash and then covered with top soil 46.

In FIG. 3, an example of a retrofit system is shown for placement over a preexisting landfill partially filled with MSW layer 50. A leachate collection system 52 is installed in the MSW layer 50, if necessary to the landfill local regulations. The collection system 52 may be placed at the top of the MSW layer 50 or embedded therein depending upon a given implementation. If the MSW layer is relatively deep, the system 52 may be embedded therein. In the alternative, the leachate collection system 52 may be covered by further MSW (not shown). The system 52 is inclined 1–2% as is the top surface of layer 50. This is to drain the leachate to the collection sump such as sump and pipe assembly 18, FIGS. 1 and 2, located to drain leachate from system 52 at the low point of the system.

In FIGS. 3 and 3a the leachate collection system 52 comprises a trench 54 filled with crushed stone 56 or other acceptable permeable material and a perforated polyvinylchloride (PVC) pipe 58. The outer surface of the trench 54 is covered with a moisture permeable geotextile 60 which is impermeable to solid particles such as ash and the like. The geotextile 60 protects the stone 56 in the trench 54 from filling and clogging with solid material surrounding the trench. A second geotextile sheet 62 is placed over the trench 54 and overlaps the MSW 50 somewhat about the trench. The trench 54 may be as deep vertically as determined by a given implementation. It should be understood that the parameters for a given landfill are significantly a function of local regulations and ambient conditions.

The trench 54 extends for the length of the cell 64. While the trench is shown at the top of the MSW layer 50 it need not be in all implementations. It may be covered by more MSW (not shown).

The MSW 50 layer is covered with a layer of MSW incinerator ash 66. This ash layer is preferably compacted in one foot thick layers and may have a nominal built up thickness of up to about ten feet or more. However, the total thickness can vary depending upon the design requirments of the the landfill. The ash 66 layer inclines as described above. Located in spaced intervals through out the layer of ash 66 are leachate conduit columns 68. These columns 68 are crushed stone or river bed stone and the like approximately two feet in diameter, but may have other dimensions as determined for a given landfill. The columns 68 serve to fluid couple the next upper layer 70 of MSW to the leachate collection system 52.

The columns 68 are spaced in the ash layer 66 according to the calculated expected leachate collection volume. The size and number of columns is calculated according to the needs of a particular landfill system. By the use of the columns, only one leachate collection system 52 is installed in a given landfill. The leachate trench 54 is surrounded with a moisture permeable and solid particle impermeable geotextile 72. The columns 68 are also surrounded by a protective layer of moisture permeable solid particle impermeable geotextile 74. Thus leachate is able to penetrate the geotextiles 72 and 74 but the stone 56 is not clogged by the ash from ash layer 66.

A sheet of geotextile 76 is also placed over the ash layer 66 adjacent to the column 68 to protect the column from solid material migration. The geotextiles 72, 74 and 76 may be nonwoven materials. Such material are known by way of example as POLYFELT, a trademark of POLYFELT Corp. Evergreen, Ala. and available from Polyfelt Corp. The material is normally used to separate two soils with different soil properties, e.g., grain size, density, consistency and so on. The material exhibits negligible migration of fine particles under static and dynamic fiber stress and is chemically and decay resistant.

The sides of the columns 68 may be sloped according to construction requirements.

Once the columns 68 and layer 66 are completed, a layer of MSW 70 is then filled thereover to the desired thickness. The layers of ash and MSW then alternate as described until the landfill is filled. The cells of ash and MSW are preferable similarly dimensioned in plan view.

A representative gas well 78, FIGS. 3 and 4, is installed in each MSW layer to collect the methane gas generated in that layer. One or more wells may be installed in a given MSW layer according to a given implementation. In FIG. 4, well 78 comprises a cavity 80 filled with crushed stone 82 or other permeable stable material in MSW layer 50. The cavity 80 is sufficiently large to collect methane gas generated in the layer 50 and which migrates to the stone filled cavity.

A perforated PVC pipe 84 is in the cavity 80 surrounded by the stone 82. A nonwoven geotextile sheet 86 is placed over the MSW layer 50 and stone filled cavity 80 to protect the cavity from ash in ash layer 66. A coupler 90 connects the pipe 84 to a solid pipe 92 which protrudes above the surface of top soil layer 94. Alternate layers of ash 98 and MSW 70 are above the ash layer 66 as described previously. The geotextile 86 also surrounds the coupler 90 and the lower portion of the pipe 94 in the ash layer 66. It should be understood that none of the drawing Figures are to scale and that the proportions shown are for convenience of illustration only.

Presently, ash is randomly discarded in landfills without regard to gas confinement. Gas confinement then is provided by additional soil layers. In accordance with the present invention, impermeable ash waste is utilized as a gas confinement layer for providing increased efficiency of landfill utilization.

In operation, a new landfill is constructed as described in connection with FIGS. 1 and 2. The leachate collection system is placed at lowermost level of the landfill adjacent to the bottom liner. Alternate layers of MSW and ash fill the cells of the landfill until cap 8 is installed.

During rainfall, water penetrates the landfill and percolates through the MSW layers via the permeable columns 24. Eventually the leachate accumulates at the bottom liner 6 and is collected by leachate collection system 16. The leachate thus collected is removed by pump and pipe assembly 18 for contaminate removal and discharge.

Methane gas accumulating in each cell is collected by gas wells 26 and supplied by blower 28 to a reception system or burned as desired. The wells 26 are spaced to maximize gas collection.

To install a gas vent such as wells 78, the MSW layer is excavated or drilled to the required depth. A preferably 6 inch slotted PVC pipe 84 is placed in the excavated cavity flush to grade. Clean crushed stone is back filled into the cavity to grade level. The geotextile fabric 86 is placed over the stone and around the PVC pipe (not shown). A six inch PVC coupling 90 and pipe 94 extension raises the pipe to about 12 inches above the proposed grade of the ash cell. This procedure is then followed as each MSW cell is installed.

In FIG. 3, a present landfill partially filled with MSW 50 is retrofitted with a leachate collection system 52. This system is dimensioned and spaced in the MSW cell layer 50 according to calculated requirements for that landfill. The leachate is collected from all of the overlying MSW layers via the permeable columns 68. These columns are also spaced and dimensioned according to a calculated need for a given landfill. The gas wells 78 are located and spaced also according to a given landfill requirement. At least one well 78 is in communication with each MSW cell to remove methane gas from that cell. More wells may be provided for larger landfills.

To assist in filling the cells a MSW layer settling gauge arrangement 96 is provide, FIG. 5. In FIG. 5, the arrangement 96 includes a plurality of spaced metal plates 98 placed over the top of a MSW layer 100. The ash cell 102 is filled with ash. A metal rod 104 upstands from each plate 98. A portion 106 of the rods protrudes above the ash in cell 102. The length of the portions 106 provides a visual determination of excess settling in the MSW layer 100. The landfill operator can then take corrective action to provide more uniform compaction of the next layer of MSW to maximize utilization of the landfill volume as settling may be wasteful, causing undesired air pockets in the MSW layers.

The ash is installed by placing it directly over a MSW cell and the leachate collection system (if present). The incinerator ash and vertical columns are to be built up in preferably twelve inch layers until the desired thickness is reached. The MSW is then placed directly over the ash cell and the process repeated. The ash layer beneath the cap 8 provides an impermeable cover over the MSW cells. Such a cover minimizes infiltration of surface water into the landfill and minimizes the production of undesirable leachate.

The methane gas confining layer described herein is useful in gas extraction projects in landfills in which gas extraction is necessary while the landfill is active and before final capping. The methane gas confining layer enables landfill operators to capitalize on valuable gas generation throughout active life of a landfill. This results in creation of more manageable zones for methane gas management, reduction of landfill emissions and odors and turns a landfill into a resource rather than merely a disposal area utilizing a material which achieves results not otherwise attainable.

While the preferred ash layer may be nominally ten feet thick, it may vary depending upon the design requirements of the landfill. When covered with top soil to support vegetation growth, the ash also assists in the prevention of side-slope break-out of leachate and minimizes the infiltration of rainwater into the dormant cells and reduces leachate generation.

Preferably the leachate collection system uses a four inch diameter perforated polyethylene pipe. The back fill of the trench is permeable crushed stone or other material with a minimum of 30% voids.

It will occur to one of ordinary skill that while incinerator ash from burned MSW is preferred as the gas containment layer, other types of waste that are gas impermeable as may become available may also be utilized as a gas containment layer. The detailed description herein is given by of illustration and not limitation. Modifications may be made to the disclosed embodiments without departing from the scope of the invention as defined by the appended claims.

What is claimed is:

1. A solid waste landfill system comprising:
a plurality of juxtaposed layers of solid waste which tend to generate methane gas during decomposition of the solid waste;
a gas containment layer of substantially fluid impermeable waste material intermediate each adjacent pair of juxtaposed solid waste layers; and
gas collection means in communication with each said solid waste layers for collecting said generated gas in each said layer.

2. The system of claim 1 wherein said gas containment layer of substantially fluid impermeable material comprises ash.

3. The system of claim 1 including leachate collection means for collecting leachate from each said solid waste layers.

4. The system of claim 3 wherein said leachate collection means comprises a vertical leachate collection conduit means through and corresponding to each said impermeable material layer for draining leachate from a next adjacent upper waste layer juxtaposed with that intermediate layer and further leachate collection conduit means transverse to and in fluid communication with the vertical collection conduit means for collecting leachate from the vertical conduit means.

5. The system of claim 3 wherein said leachate collection means comprises a plurality of separate leachate collection means each corresponding to and coupled to a different one of said waste layers for draining leachate from the corresponding waste layer.

6. The system of claim 3 wherein said leachate collection means includes a vertical leachate conduit through each solid waste layer and the next adjacent intermediate layer thereabove and a leachate collection conduit beneath the lowermost of said layers in fluid communication with and transverse to the vertical leachate conduit through the lowermost of said layers, each said vertical conduit being in fluid communication with the next adjacent solid waste layer on the next adjacent intermediate layer for collecting leachate in said next adjacent waste layer.

7. The system of claim 1 wherein said gas containment intermediate impermeable layer comprises a substantially fluid impermeable layer of incinerated solid waste ash.

8. The system of claim 1 wherein the gas collection means comprises a bore containing permeable stone in each solid waste layer and a perforated pipe embedded in said stone and in communication with the ambient atmosphere above said layers, at least one separate pipe and bore corresponding to each said solid waste layers.

9. The system of claim 8 including a geotextile moisture permeable layer between said bore stone and the next adjacent intermediate layer at and above each said bore and a fluid impermeable pipe in fluid communication with the perforated pipe extending into and through said intermediate layer at each said bore.

10. The system of claim 9 wherein said fluid impermeable pipe extends from said perforated pipe to said ambient atmosphere.

11. The system of claim 2 wherein said ash is compacted.

12. The system of claim 11 wherein the compacted ash is approximately at least one foot thick.

13. The system of claim 6 wherein the vertical conduit comprises stone surrounded by a geotextile moisture permeable geotextile.

14. The system of claim 6 including a plurality of said vertical conduit in fluid communication with each said solid waste layer.

15. The system of claim 1 wherein the gas collection means comprises a plurality of gas collecting wells each in fluid communication with a separate different solid waste layer for collecting said generated gas in that layer.

16. The system of claim 1 wherein said layers are inclined relative to the horizontal.

17. The system of claim 1 including said intermediate layer over the top most layer of said plurality of waste layers.

18. The system of claim 1 wherein said solid waste layers each tend to settle, said system including means for monitoring the settling of each said waste layer in the presence of an intermediate layer over each said waste layer.

19. In a solid waste landfill having a bottom layer of solid waste, said solid waste tending to generate methane gas, said solid waste including undesirable leachate, a solid waste gas recovery system comprising:
a leachate collection arrangement coupled to said bottom layer of solid waste;
a layer of substantially fluid impermeable incinerated waste ash on said solid waste bottom layer;
a juxtaposed layer of solid waste on said ash;
leachate collection means coupled to said juxtaposed layer of solid waste; and
gas collection means in communication with each said solid waste layer for collecting said generated gas in each said layer.

20. The system of claim 19 including alternating layers of solid waste and said ash, a leachate collection arrangement being disposed coupled to each solid waste layer for removing collected leachate wherein each ash layer has a leachate collection column therethrough fluid coupled to the next adjacent solid waste layer thereabove and fluid coupled to a transverse leachate collection arrangement beneath the lowermost of said layers.

21. The system of claim 19 wherein the gas collection means includes a separate different gas collection pipe in fluid communication with and corresponding to each solid waste layer.

* * * * *